US007659963B2

(12) United States Patent
Kweon et al.

(10) Patent No.: US 7,659,963 B2
(45) Date of Patent: Feb. 9, 2010

(54) LIQUID CRYSTAL DISPENSING APPARATUS WITH NOZZLE CLEANING DEVICE

(75) Inventors: Hyug-Jin Kweon, Kyoungsangbuk-Do (KR); Hae-Joon Son, Pusan (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/329,429

(22) Filed: Dec. 27, 2002

(65) Prior Publication Data

US 2003/0155373 A1 Aug. 21, 2003

(30) Foreign Application Priority Data

Feb. 20, 2002 (KR) ..................... 10-2002-0009123

(51) Int. Cl.
*G02F 1/1341* (2006.01)

(52) U.S. Cl. ..................................................... 349/189

(58) Field of Classification Search ................. 349/187, 349/188, 189
See application file for complete search history.

(56) References Cited

U.S. PATENT DOCUMENTS 3,978,580 A 9/1976 Leupp et al.
4,094,058 A 6/1978 Yasutake et al.
4,653,864 A 3/1987 Baron et al.
4,691,995 A 9/1987 Yamazaki et al.
4,775,225 A 10/1988 Tsuboyama et al.
5,074,443 A 12/1991 Fujii et al.
5,247,377 A 9/1993 Omeis et al.
5,263,888 A 11/1993 Ishihara et al.
5,375,738 A * 12/1994 Walsh et al. ................... 222/1
5,379,139 A 1/1995 Sato et al.
5,406,989 A 4/1995 Abe
5,499,128 A 3/1996 Hasegawa et al.
5,507,323 A 4/1996 Abe
5,511,591 A 4/1996 Abe
5,535,919 A * 7/1996 Ganzer et al. .................. 222/1
5,539,545 A 7/1996 Shimizu et al.
5,548,429 A 8/1996 Tsujita
5,642,214 A 6/1997 Ishii et al.
5,666,987 A * 9/1997 Combs .......................... 137/1
5,680,189 A 10/1997 Shimizu et al.

(Continued)

FOREIGN PATENT DOCUMENTS

CN 2293839 10/1998

(Continued)

OTHER PUBLICATIONS

Chinese Patent Office Action dated Dec. 8, 2006; KR Appln No. 031054110 (English Translation included).

*Primary Examiner*—Timothy Rude
(74) *Attorney, Agent, or Firm*—McKenna Long & Aldridge

(57) ABSTRACT

A liquid crystal dispensing apparatus includes a liquid crystal dispensing means and a nozzle cleaning means. The liquid crystal dispensing means includes a liquid crystal container for containing liquid crystal material and a nozzle through which the liquid crystal material may be dispensed on a substrate. The nozzle cleaning means is arranged around the nozzle and removes liquid crystal residue accumulated on a surface of the nozzle, moves to a lower portion of the nozzle to suck and remove the liquid crystal residue after liquid crystal material is dispensed by the liquid crystal dispensing means a predetermined number of times.

5 Claims, 7 Drawing Sheets

U.S. PATENT DOCUMENTS

| | | | | |
|---|---|---|---|---|
| 5,742,370 | A | 4/1998 | Kim et al. | |
| 5,757,451 | A | 5/1998 | Miyazaki et al. | |
| 5,803,970 | A * | 9/1998 | Tateyama et al. | 118/319 |
| 5,852,484 | A | 12/1998 | Inoue et al. | |
| 5,854,664 | A | 12/1998 | Inoue et al. | |
| 5,861,932 | A | 1/1999 | Inata et al. | |
| 5,875,922 | A | 3/1999 | Chastine et al. | |
| 5,952,676 | A | 9/1999 | Sato et al. | |
| 5,956,112 | A | 9/1999 | Fujimori et al. | |
| 6,001,203 | A | 12/1999 | Yamada et al. | |
| 6,011,609 | A | 1/2000 | Kato et al. | |
| 6,016,178 | A | 1/2000 | Kataoka et al. | |
| 6,016,181 | A | 1/2000 | Shimada | |
| 6,055,035 | A | 4/2000 | von Gutfeld et al. | |
| 6,163,357 | A | 12/2000 | Nakamura | |
| 6,210,481 | B1 * | 4/2001 | Sakai et al. | 118/697 |
| 6,219,126 | B1 | 4/2001 | von Gutfeld | |
| 6,226,067 | B1 | 5/2001 | Nishiguchi et al. | |
| 6,236,445 | B1 | 5/2001 | Foschaar et al. | |
| 6,287,390 | B2 * | 9/2001 | Sakai et al. | 134/18 |
| 6,304,306 | B1 | 10/2001 | Shiomi et al. | |
| 6,304,311 | B1 | 10/2001 | Egami et al. | |
| 6,337,730 | B1 | 1/2002 | Ozaki et al. | |
| 6,414,733 | B1 | 7/2002 | Ishikawa et al. | |
| 6,444,409 | B2 * | 9/2002 | Araki et al. | 430/325 |
| 6,565,185 | B1 * | 5/2003 | Endo | 347/23 |
| 6,824,023 | B2 * | 11/2004 | Kim et al. | 222/504 |
| 2001/0004878 | A1 * | 6/2001 | Sakai et al. | 118/70 |
| 2001/0021000 | A1 | 9/2001 | Egami | |
| 2002/0020763 | A1 * | 2/2002 | Hirae et al. | 239/418 |
| 2003/0146297 | A1 * | 8/2003 | Jeung et al. | 239/288 |
| 2003/0180978 | A1 * | 9/2003 | Kweon et al. | 438/30 |
| 2004/0001177 | A1 * | 1/2004 | Byun et al. | 349/187 |
| 2005/0030470 | A1 * | 2/2005 | Kim et al. | 349/189 |
| 2005/0122463 | A1 * | 6/2005 | Byun et al. | 349/187 |

FOREIGN PATENT DOCUMENTS

| | | | |
|---|---|---|---|
| EP | 1 003 066 A1 | A1 | 5/2000 |
| JP | 51-065656 | | 6/1976 |
| JP | 57-038414 | A1 | 3/1982 |
| JP | 57-088428 | A1 | 6/1982 |
| JP | 58-027126 | A1 | 2/1983 |
| JP | 59-057221 | | 4/1984 |
| JP | 59-195222 | | 11/1984 |
| JP | 60-111221 | | 6/1985 |
| JP | 60-164723 | A1 | 8/1985 |
| JP | 60-217343 | A1 | 10/1985 |
| JP | 61-007822 | A1 | 1/1986 |
| JP | 61-055625 | A1 | 3/1986 |
| JP | 62-054225 | | 3/1987 |
| JP | 62-054228 | | 3/1987 |
| JP | 62-054229 | | 3/1987 |
| JP | 62-089025 | A1 | 4/1987 |
| JP | 62-090622 | A1 | 4/1987 |
| JP | 62-205319 | A1 | 9/1987 |
| JP | 63-109413 | A1 | 5/1988 |
| JP | 63-110425 | A1 | 5/1988 |
| JP | 63-128315 | A1 | 5/1988 |
| JP | 63-311233 | A1 | 12/1988 |
| JP | 03-009549 | | 1/1991 |
| JP | 05-036425 | | 2/1993 |
| JP | 05-036426 | | 2/1993 |
| JP | 05-107533 | | 4/1993 |
| JP | 05-127179 | A1 | 5/1993 |
| JP | 05-154923 | | 6/1993 |
| JP | 05-265011 | A1 | 10/1993 |
| JP | 05-281557 | A1 | 10/1993 |
| JP | 05-281562 | A1 | 10/1993 |
| JP | 06-018829 | | 1/1994 |
| JP | 06-051256 | A1 | 2/1994 |
| JP | 06-064229 | | 3/1994 |
| JP | 06-114314 | | 4/1994 |
| JP | 06-148657 | A1 | 5/1994 |
| JP | 06-160871 | | 6/1994 |
| JP | 06-194637 | | 7/1994 |
| JP | 06-235925 | | 8/1994 |
| JP | 06-265915 | A1 | 9/1994 |
| JP | 06-313870 | | 11/1994 |
| JP | 07-084268 | | 3/1995 |
| JP | 07-128674 | A1 | 5/1995 |
| JP | 07-181507 | A1 | 7/1995 |
| JP | 07-275770 | | 10/1995 |
| JP | 07-275771 | | 10/1995 |
| JP | 08-076133 | | 3/1996 |
| JP | 08-095066 | A1 | 4/1996 |
| JP | 08-101395 | | 4/1996 |
| JP | 08-106101 | A1 | 4/1996 |
| JP | 08-110504 | | 4/1996 |
| JP | 08-122122 | | 5/1996 |
| JP | 08-136937 | | 5/1996 |
| JP | 08-171094 | A1 | 7/1996 |
| JP | 08-173874 | | 7/1996 |
| JP | 08-190099 | A1 | 7/1996 |
| JP | 08-240807 | A1 | 9/1996 |
| JP | 09-001026 | | 1/1997 |
| JP | 09-005762 | A1 | 1/1997 |
| JP | 09-026578 | A1 | 1/1997 |
| JP | 09-061829 | | 3/1997 |
| JP | 09-073075 | A1 | 3/1997 |
| JP | 09-073096 | A1 | 3/1997 |
| JP | 09-094500 | | 4/1997 |
| JP | 09-127528 | A1 | 5/1997 |
| JP | 09-230357 | A1 | 9/1997 |
| JP | 09-281511 | A1 | 10/1997 |
| JP | 09-311340 | A1 | 12/1997 |
| JP | 10-123537 | A1 | 5/1998 |
| JP | 10-123538 | A1 | 5/1998 |
| JP | 10-142616 | A1 | 5/1998 |
| JP | 10-174924 | | 6/1998 |
| JP | 10-177178 | | 6/1998 |
| JP | 10-221700 | A1 | 8/1998 |
| JP | 10-282512 | A1 | 10/1998 |
| JP | 10-333157 | | 12/1998 |
| JP | 10-333159 | | 12/1998 |
| JP | 11-014953 | A1 | 1/1999 |
| JP | 11-038424 | A1 | 2/1999 |
| JP | 11-057572 | | 3/1999 |
| JP | 11-064811 | A1 | 3/1999 |
| JP | 11-109388 | A1 | 4/1999 |
| JP | 11-133438 | | 5/1999 |
| JP | 11-142864 | | 5/1999 |
| JP | 11-174477 | A1 | 7/1999 |
| JP | 11-212045 | A1 | 8/1999 |
| JP | 11-248930 | | 9/1999 |
| JP | 11-262712 | | 9/1999 |
| JP | 11-264991 | | 9/1999 |
| JP | 11-326922 | | 11/1999 |
| JP | 11-342357 | | 12/1999 |
| JP | 11-344714 | A1 | 12/1999 |
| JP | 2000-002879 | | 1/2000 |
| JP | 2000-029035 | | 1/2000 |
| JP | 2000-056311 | | 2/2000 |
| JP | 2000-066165 | | 3/2000 |
| JP | 2000-066218 | | 3/2000 |
| JP | 2000-093866 | | 4/2000 |
| JP | 2000-137235 | | 5/2000 |
| JP | 2000-147528 | | 5/2000 |
| JP | 2000-193988 | | 7/2000 |
| JP | 2000-241824 | | 9/2000 |
| JP | 2000-284295 | | 10/2000 |
| JP | 2000-292799 | | 10/2000 |
| JP | 2000-310759 | | 11/2000 |
| JP | 2000-310784 | | 11/2000 |

| | | | |
|---|---|---|---|
| JP | 2000-338501 | | 12/2000 |
| JP | 2001-005401 | | 1/2001 |
| JP | 2001-005405 | | 1/2001 |
| JP | 2001-013506 | | 1/2001 |
| JP | 2001-033793 | A1 | 2/2001 |
| JP | 2001-042341 | | 2/2001 |
| JP | 2001-051284 | | 2/2001 |
| JP | 2001-066615 | | 3/2001 |
| JP | 2001-091727 | | 4/2001 |
| JP | 2001-117105 | | 4/2001 |
| JP | 2001-117109 | | 4/2001 |
| JP | 2001-133745 | | 5/2001 |
| JP | 2001-133794 | | 5/2001 |
| JP | 2001-133799 | | 5/2001 |
| JP | 2001-142074 | | 5/2001 |
| JP | 2001-147437 | | 5/2001 |
| JP | 2001-154211 | | 6/2001 |
| JP | 2001-166272 | | 6/2001 |
| JP | 2001-166310 | | 6/2001 |
| JP | 2001-183683 | | 7/2001 |
| JP | 2001-209052 | | 8/2001 |
| JP | 2001-209056 | | 8/2001 |
| JP | 2001-209057 | | 8/2001 |
| JP | 2001-209058 | | 8/2001 |
| JP | 2001-209060 | | 8/2001 |
| JP | 2001-222017 | | 8/2001 |
| JP | 2001-235758 | | 8/2001 |
| JP | 2001-215459 | | 9/2001 |
| JP | 2001-255542 | | 9/2001 |
| JP | 2001-264782 | | 9/2001 |
| JP | 2001-201750 | | 10/2001 |
| JP | 2001-272640 | | 10/2001 |
| JP | 2001-281675 | | 10/2001 |
| JP | 2001-281678 | | 10/2001 |
| JP | 2001-282126 | | 10/2001 |
| JP | 2001-305563 | | 10/2001 |
| JP | 2001-330837 | | 11/2001 |
| JP | 2001-330840 | A1 | 11/2001 |
| JP | 2001-356353 | | 12/2001 |
| JP | 2001-356354 | A1 | 12/2001 |
| JP | 2002-014360 | A1 | 1/2002 |
| JP | 2002-023176 | A1 | 1/2002 |
| JP | 2002-049045 | A1 | 2/2002 |
| JP | 2002-079160 | | 3/2002 |
| JP | 2002-080321 | | 3/2002 |
| JP | 2002-082340 | A1 | 3/2002 |
| JP | 2002-090759 | A1 | 3/2002 |
| JP | 2002-090760 | A1 | 3/2002 |
| JP | 2002-107740 | A1 | 4/2002 |
| JP | 2002-122870 | | 4/2002 |
| JP | 2002-122872 | A1 | 4/2002 |
| JP | 2002-122873 | A1 | 4/2002 |
| JP | 2002-131762 | | 5/2002 |
| JP | 2002-139734 | | 5/2002 |
| JP | 2002-156518 | | 5/2002 |
| JP | 2002-169166 | | 6/2002 |
| JP | 2002-169167 | | 6/2002 |
| JP | 2002-182222 | | 6/2002 |
| JP | 2002-202512 | A1 | 7/2002 |
| JP | 2002-202514 | A1 | 7/2002 |
| JP | 2002-214626 | A1 | 7/2002 |
| JP | 2002-229042 | | 8/2002 |
| JP | 2002-236276 | | 8/2002 |
| JP | 2002-258299 | | 8/2002 |
| JP | 2002-236292 | | 9/2002 |
| JP | 2002-277865 | | 9/2002 |
| JP | 2002-277866 | | 9/2002 |
| JP | 2002-277881 | | 9/2002 |
| JP | 2002-287156 | | 10/2002 |
| JP | 2002-296605 | | 10/2002 |
| JP | 2002-311438 | | 10/2002 |
| JP | 2002-311440 | | 10/2002 |
| JP | 2002-311442 | | 10/2002 |
| JP | 2002-323687 | | 11/2002 |
| JP | 2002-323694 | | 11/2002 |
| JP | 2002-333628 | | 11/2002 |
| JP | 2002-333635 | | 11/2002 |
| JP | 2002-333843 | | 11/2002 |
| JP | 2002-341329 | | 11/2002 |
| JP | 2002-341355 | | 11/2002 |
| JP | 2002-341356 | | 11/2002 |
| JP | 2002-341357 | | 11/2002 |
| JP | 2002-341358 | | 11/2002 |
| JP | 2002-341359 | | 11/2002 |
| JP | 2002-341362 | | 11/2002 |
| KR | 2000-035302 | A1 | 6/2000 |

* cited by examiner

LIQUID CRYSTAL DISPENSING APPARATUS WITH NOZZLE CLEANING DEVICE

This application claims the benefit of Korean Patent Application No. 2002-9123, filed on Feb. 20, 2002, which is hereby incorporated by reference for all purposes as if fully set forth herein. This application incorporates by reference two co-pending applications, Ser. No. 10/184,096, filed on Jun. 28, 2002, entitled "SYSTEM AND METHOD FOR MANUFACTURING LIQUID CRYSTAL DISPLAY DEVICES" and Ser. No. 10/184,088, filed on Jun. 28, 2002, entitled "SYSTEM FOR FABRICATING LIQUID CRYSTAL DISPLAY AND METHOD OF FABRICATING LIQUID CRYSTAL DISPLAY USING THE SAME" (8733.684.00), as if fully set forth herein.

BACKGROUND OF THE INVENTION

1. Field of the Invention

The present invention relates to a liquid crystal dispensing apparatus, and more particularly, to a liquid crystal dispensing apparatus incorporating a cleaning device capable of removing liquid crystal residue accumulated on a nozzle.

2. Discussion of the Related Art

As portable electric devices such as mobile phones, personal digital assistants (PDA), notebook computers, etc., continue to be developed, small, light, and power-efficient flat panel display devices such as liquid crystal displays (LCD), plasma display panels (PDP), field emission displays (FED), vacuum fluorescent displays (VFD), etc., have become the subject of intense research. Due to their ability to be mass-produced, ease in driving, and superior image qualities, LCDs are of particular interest.

LCDs display information on a screen using refractive anisotropic properties of liquid crystal material. Referring to FIG. 1, an LCD 1 typically includes a lower substrate (i.e., a driving device array substrate) 5 connected to an upper substrate (i.e., a color filter substrate) 3 via sealant 9. A layer of liquid crystal material 7 separates the lower and upper substrates 5 and 3. A plurality of pixels (not shown) are formed on the lower substrate 5 and driving devices such as thin film transistors (TFTs) are formed on each of the pixels. A color filter layer is formed on the upper substrate 3 allowing the LCD to express color. Further, pixel electrodes and a common electrode are also formed on the lower and upper substrates 5 and 3, respectively. An alignment layer is formed on both the lower and upper substrates 5 and 3 to uniformly align molecules within the layer of liquid crystal material 7. The molecules within the layer of liquid crystal material may be selectively oriented by the driving devices. Accordingly, as the orientation of the molecules within the liquid crystal material is manipulated, the amount of light transmitted through portions of the LCD may be selectively controlled to convey information.

Fabrication processes for LCD devices may be roughly divided into a driving device array fabrication process, where driving devices are formed on the lower substrate 5, a color filter fabrication process, where the color filter is formed on the upper substrate 3, and a cell fabrication process. These fabrication processes will now be described with reference to FIG. 2.

Referring to FIG. 2, in the driving device array substrate fabrication process (S101), a plurality pixel areas are formed at crossings of a plurality of gate lines and data lines formed on the lower substrate 5 and thin film transistors arranged in each pixel area are connected to gate lines and corresponding ones of data lines. Also, pixel electrodes are connected to each of the thin film transistors to drive the layer of liquid crystal material. Accordingly, the layer of liquid crystal material may be driven in accordance with a signal applied to the thin film transistor.

In the color filter fabrication process (S104), red (R), green (G), and blue (B) color filter layers for producing color and a common electrode are formed on the upper substrate 3.

The alignment layer is formed on both the lower and upper substrates 5 and 3, respectively. After being formed on the substrates, the alignment layer is rubbed to induce molecules within the layer of liquid crystal material to inherit a predetermined pretilt angle and alignment direction between the lower and upper substrates 5 and 3 (S102 and S105). Subsequently, spacers are dispensed over the lower substrate 5 to maintain a uniform cell gap between the upper and lower substrates (S103). The sealant is applied to an outer portion of the upper substrate 3 (S106) and the lower substrate 5 is pressed and attached to the upper substrate 3 (S107).

The lower and upper substrates 5 and 3 are formed from glass substrates having an area larger in size than any individual panel areas. Accordingly, a plurality of corresponding panel areas where driving devices and color filter layers are may be arranged within the attached glass substrates. Thus, in fabricating individual liquid crystal display panels, the attached glass substrates are cut into individual panels (S108). Subsequently, liquid crystal material is injected through a liquid crystal injection opening into the cell gap formed between the two substrates of each individual liquid crystal display panel (S109). After the liquid crystal material is injected, the liquid crystal injection opening is sealed (S109) and each individual liquid crystal display panel is inspected (S110).

To inject the liquid crystal material through the liquid crystal injection opening, a pressure difference between the exterior and the interior of the liquid crystal display panel is induced. FIG. 3 illustrates a device used to inject liquid crystal material into cell gaps of liquid crystal display panels.

Referring to FIG. 3, liquid crystal material 14 is provided in a container 12 arranged within a vacuum chamber 10 that is connected to a vacuum pump (not shown) capable of creating and maintaining a vacuum within the vacuum chamber. A liquid crystal display panel moving device (not shown) is installed within the vacuum chamber 10 and moves separated liquid crystal display panels down from an upper portion of the container 12 toward the surface of the liquid crystal material 14. In what is known as a liquid crystal injection method, the liquid crystal injection opening 16 of each liquid crystal display panel is arranged to contact the liquid crystal material. Subsequently, nitrogen gas (N2) is pumped into the vacuum chamber to increase the pressure therein from the initial vacuum pressure. As the pressure within the vacuum chamber 10 increases, the liquid crystal material 14 contacting the liquid crystal injection opening 16 is extruded (i.e., injected) into the cell gap of the liquid crystal display panel due to the pressure difference between the interior of the liquid crystal display panel and the interior of the vacuum chamber containing the pumped nitrogen gas. After the cell gap is completely filled with liquid crystal material 14, the injection opening 16 is sealed using a sealant.

Injecting liquid crystal material according to the process described above is disadvantageous, however, at least for the following reasons.

First, the amount of time required to completely inject liquid crystal material 14 into the liquid crystal display panel 1 can be excessively long. For example, the cell gap between the driving device array and the color filter substrates is very narrow (e.g., on the order of a few micrometers) and, therefore, only a very small amount of liquid crystal material can be injected into the liquid crystal display panel at any time. Accordingly, injecting liquid crystal material into a typical 15-inch liquid crystal display panel using the injection process described above may take up to about eight hours. Thus, the time required to fabricate LCDs is unduly increased with the use of the liquid crystal injection process.

Second, the amount of liquid crystal material required by the liquid crystal injection method described above is exceedingly large. While only a small amount of liquid crystal is removed from the container 12, a large amount of liquid crystal may become exposed to the atmosphere or to the nitrogen gas. Accordingly, a large amount of liquid crystal material reacts with, and can be contaminated by, nitrogen or other gases within the atmosphere. As a result, the cost of fabricating LCDs increases because liquid crystal material not injected into the liquid crystal display panel must be discarded after the injection process.

SUMMARY OF THE INVENTION

Accordingly, the present invention is directed to liquid crystal dispensing apparatus incorporating a nozzle cleaning device that substantially obviates one or more of the problems due to limitations and disadvantages of the related art.

An advantage of the present invention provides a liquid crystal dispensing apparatus incorporating a nozzle cleaning device capable of removing liquid crystal residue accumulated on a surface of a nozzle. In one aspect of the present invention, the nozzle cleaning device may include a vacuum.

Another advantage of the present invention provides a liquid crystal dispensing apparatus incorporating a nozzle cleaning device capable of dispensing a precise amount of liquid crystal material.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these advantages of the present invention, as embodied and broadly described herein, a nozzle cleaning device may, for example, include a main body arranged around a liquid crystal dispensing apparatus capable of dispensing liquid crystal material onto a substrate, a suction tube for removing liquid crystal residue accumulated on a surface of a nozzle of the liquid crystal dispensing apparatus after liquid crystal is dispensed by the liquid crystal dispensing apparatus a predetermined number of times, and a vacuum pump connected to the suction tube for creating a suction force capable of removing liquid crystal residue accumulated on the surface of the nozzle. The substrate may include at least one panel area.

In one aspect of the present invention, a liquid crystal dispensing apparatus may, for example, include a liquid crystal dispensing means, for dispensing liquid crystal material onto a substrate through a nozzle, and a nozzle cleaning means arranged around the nozzle, for removing liquid crystal residue accumulated on the nozzle surface.

In another aspect of the present invention, the liquid crystal dispensing apparatus may, for example, include a liquid crystal container capable of dispensing liquid crystal material, a gas input, a case for receiving the liquid crystal container, a needle sheet arranged at a lower portion of the liquid crystal container, wherein the needle sheet includes a discharge hole through which liquid crystal in the liquid crystal container is dispensed, a needle capable of being inserted into and moveable within the liquid crystal container, wherein the needle includes a first end on which a spring is arranged and a second end that selectively opens/closes the discharge hole by moving toward and away from the needle sheet, a solenoid coil and a magnetic bar mounted on an upper portion of the needle for generating magnetic force upon the application of electric power to thereby move the needle away from the needle sheet, and a nozzle coupled to a lower portion of the liquid crystal container for dispensing liquid crystal material contained therein onto the substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which is illustrated in the accompanying drawings.

In order to solve the problems of the aforementioned liquid crystal material injection methods, liquid crystal dispensing methods have been proposed. The liquid crystal dispensing method forms a liquid crystal layer by dispensing liquid crystal material directly onto a substrate and uniformly distributing the dispensed liquid crystal material over the entire surface of the substrate by pressing the substrate. The aforementioned liquid crystal dispensing method enables the liquid crystal material to be arranged on the substrate within a short period of time so that the process of forming a liquid crystal layer in large LCD panels may be performed quickly. Since a predetermined amount of liquid crystal material is dispensed on the substrate, consumption of liquid crystal material is minimized and costs of manufacturing LCDs may be reduced.

Figure 4:
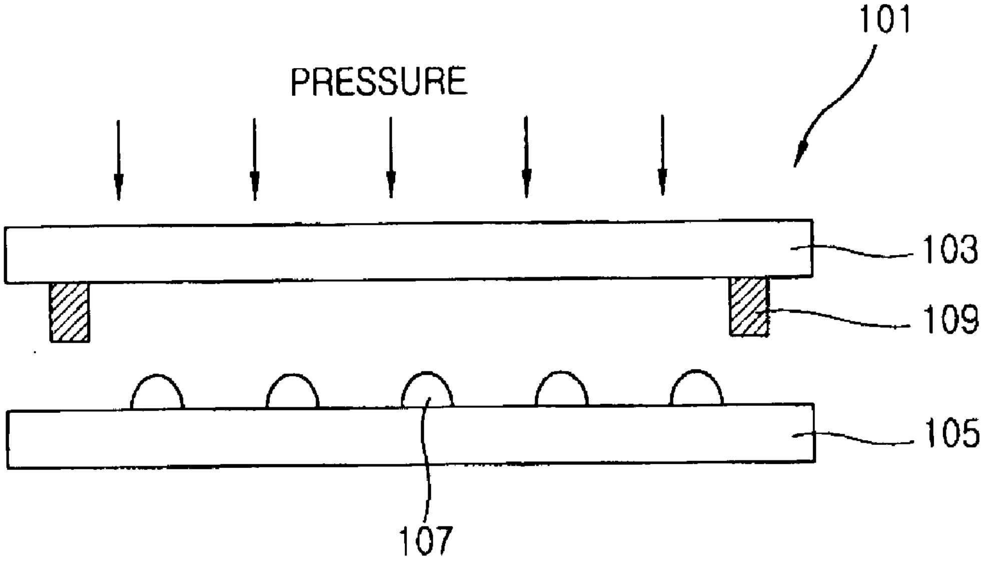
FIG. 4 illustrates the fabrication of an LCD using a liquid crystal dispensing method according to one aspect of the present invention.

FIG. 4 illustrates the fabrication of an LCD using a liquid crystal dispensing method according to one aspect of the present invention.

Referring to FIG. 4, the liquid crystal material may be dispensed prior to bonding a lower substrate 105, on which driving devices may be formed, and an upper substrate 103, on which a color filter may be formed, together. Accordingly, liquid crystal material 107 may be dispensed on the lower substrate 105, for example, in the form of a droplet. Alternatively, the liquid crystal material 107 may be dispensed on the upper substrate 103. Regardless of which substrate supports the liquid crystal material 107, during the bonding process, the substrate supporting liquid crystal material 107 should be arranged such that it is located under the other substrate, wherein the liquid crystal material 107 is arranged between the two substrates.

Sealant 109 may be dispensed along edges on the upper substrate 103 to bond the upper substrate 103 to the lower substrate 105 when they are pressed together. As the upper and lower substrates 103 and 105, respectively, are pressed, the liquid crystal material 107 becomes spread so that a liquid crystal layer having a uniform thickness may be formed between the upper and lower substrate 103 and 105. Subsequently, the bonded substrates may be separated into individual LCD panels. Accordingly, the liquid crystal dispensing method may dispense liquid crystal material 107 onto the lower substrate 105 prior to final assembly of the liquid crystal display panel 101.

Figure 1:
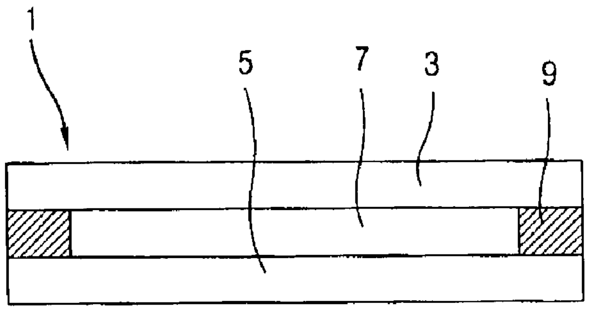
FIG. 1 RELATED ART
FIG. 1 illustrates a cross-sectional view of a related art liquid crystal display (LCD) device.
Figure 2:
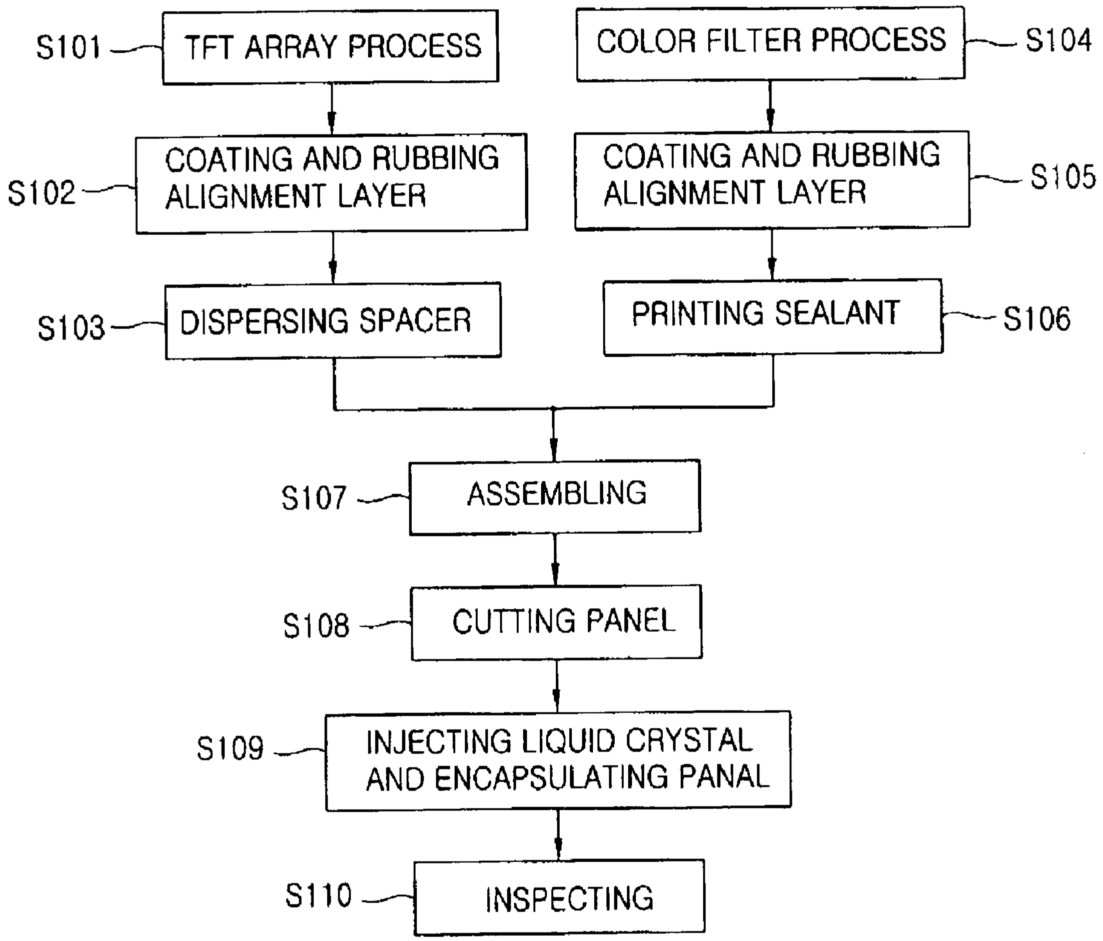
FIG. 2 RELATED ART
FIG. 2 illustrates a flow chart of a related art LCD fabrication method.
Figure 3:
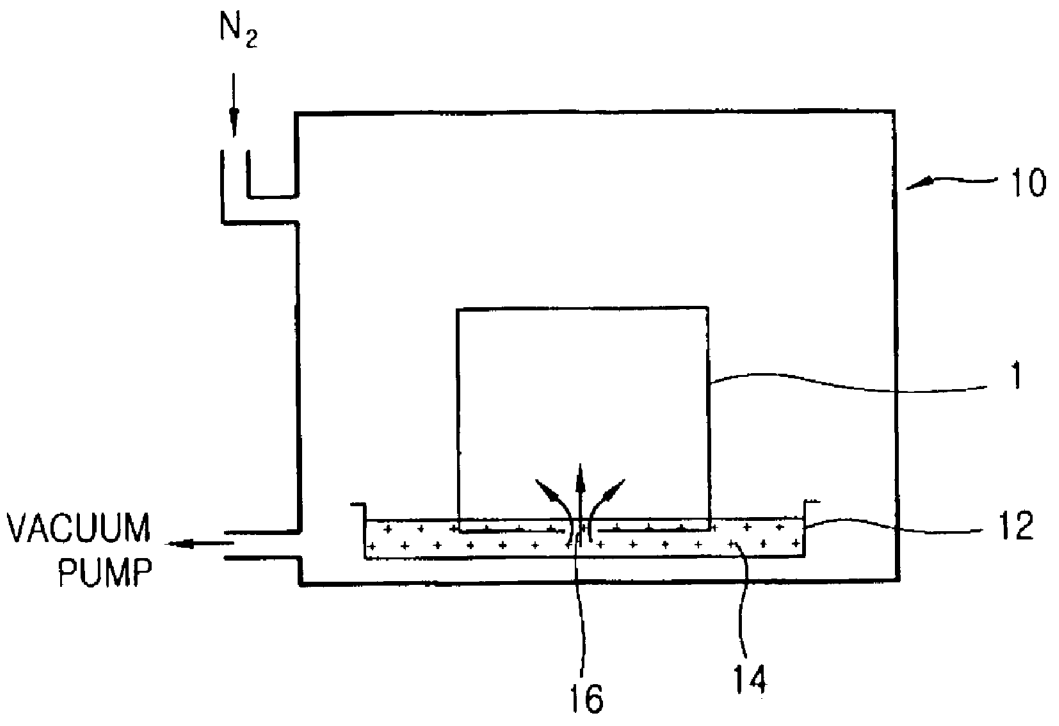
FIG. 3 RELATED ART
FIG. 3 illustrates injection of liquid crystal material in a related art LCD device.

As is evident, the liquid crystal injection method illustrated in FIGS. 1-3 differs from the liquid crystal dispensing method illustrated in FIG. 4. For example, in injecting liquid crystal material, a glass substrate must be divided into individual panels to inject the liquid crystal while, in dispensing liquid crystal material, liquid crystal material is dispensed individual panels from a glass substrate already processed and divided.

Figure 5:
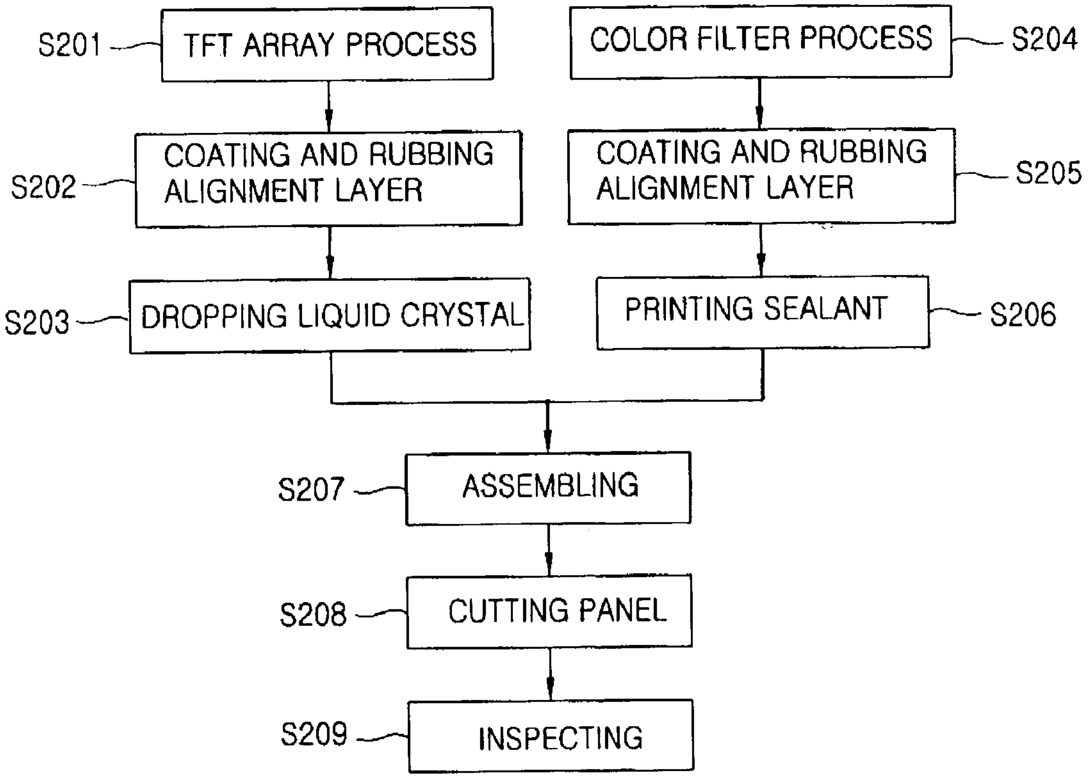
FIG. 5 illustrates a flow chart of a method for fabricating an LCD device using a liquid crystal dispensing method.

FIG. 5 illustrates a flow chart of a method for fabricating LCD device using a liquid crystal dispensing method.

Referring to FIG. 5, driving devices (e.g., TFTs) and a color filter layer are formed on the lower and upper substrates, respectively, in respective TFT array fabrication and color filter fabrication processes (S201 and S204), similar to the driving device array substrate fabrication and color filter fabrication processes shown in FIG. 2. The lower and upper substrates may be provided as glass substrates including a plurality of individual panel areas. By incorporating the liquid crystal dispensing method in the fabrication of LCDs, glass substrates having an area up to $1000\times1200$ $mm^2$ or more (an area much larger than glass substrates fabricated using liquid crystal injection methods) may be efficiently processed into individual panels.

An alignment layer may be formed on the lower and upper substrates. Subsequently, the alignment layers may be rubbed (S202 and S205) and liquid crystal material may be dispensed onto liquid crystal display panel areas within the lower substrate (S203). Also, sealant may be applied to outer portions of corresponding liquid crystal display panel areas within the upper substrate (S206).

Next, the upper and lower substrates may be disposed opposite each other and pressed and attached together via the sealant. When the two substrates are pressed, the dispensed liquid crystal material spreads uniformly over the entire surface of the panels (S207). By the aforementioned liquid crystal dispensing method, a plurality of liquid crystal display panels may be simultaneously formed within the attached upper and lower glass substrates. Next, the attached glass substrates may be cut (S208) to separate the plurality of individual LCD panels. The individual LCD panels may then be inspected (S209).

Manufacturing LCDs according to the aforementioned liquid crystal dispensing method is advantageous over the liquid crystal injection method illustrated, for example, in FIG. 2 in that layers of liquid crystal material may be rapidly formed between the upper and lower substrates. The liquid crystal injection method shown in FIG. 2 requires the injection opening to be sealed by the sealing material after injection is complete. However, in fabricating LCDs via the liquid crystal dispensing method, no injection openings exist that need to be sealed. In fabricating LCDs via the liquid crystal injection method, panels contact liquid crystal material within the container during injection. As a result, outer surfaces of the LCD panels become contaminated and a cleaning process is required. However, in fabricating LCDs via the liquid crystal dispensing method, liquid crystal material may be dispensed directly onto the substrate. As a result, outer surfaces of substrates are not contaminated with liquid crystal material and extra cleaning processes are not required. Accordingly, methods of fabricating LCDs that incorporate liquid crystal dispensing methods are less complex, more efficient, and have a greater yield than methods of fabricating LCDs that incorporate liquid crystal injection methods.

In fabricating LCDs via the liquid crystal dispensing method, the layer of liquid crystal material must be formed to a predetermined thickness, directly proportional to the size of the cell gap in the LCD panel. Accordingly, positions of the liquid crystal droplets and the amount of liquid crystal material they contain must be precisely controlled. Therefore, an apparatus for dispensing liquid crystal material in precisely arranged droplets each containing a precise amount of liquid crystal material is provided in accordance with the principles of the present invention.

Figure 6:
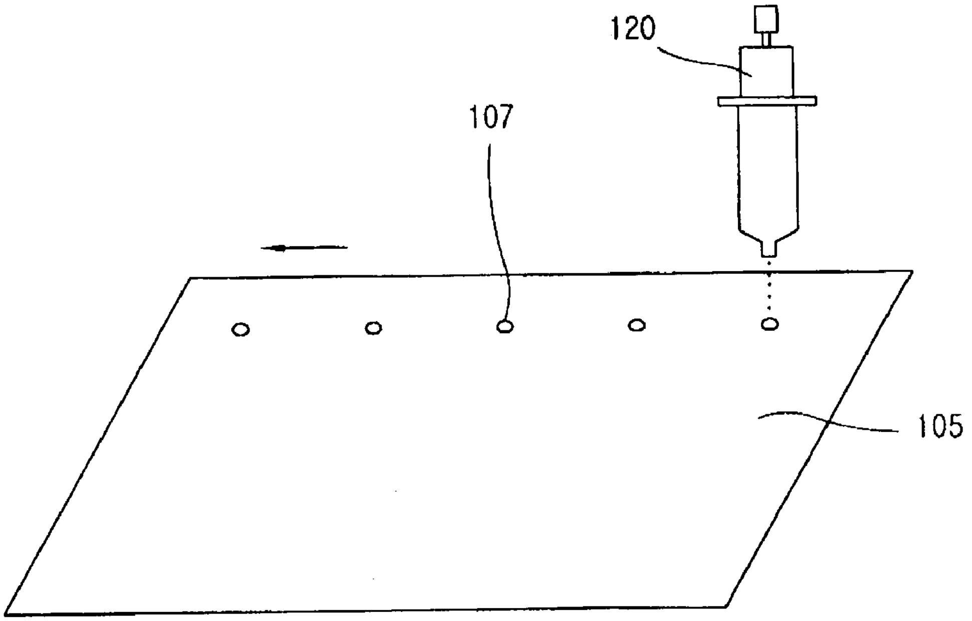
FIG. 6 illustrates the fabrication of an LCD using a liquid crystal dispensing method according to another aspect of the present invention.

FIG. 6 illustrates the fabrication of an LCD using a liquid crystal dispensing method according to one aspect of the present invention.

Referring to FIG. 6, liquid crystal material 107 may be dispensed onto the lower substrate 105 (including a plurality of panel areas) using a liquid crystal dispensing apparatus 120. In accordance with the principles of the present invention, the liquid crystal dispensing apparatus 120 may be arranged over the substrate 105 and, although not shown in FIG. 6, contains liquid crystal material to be dispensed.

Generally, the liquid crystal material 107 is dispensed onto the substrate in the form of a droplet. In a first aspect of the present invention, the substrate 105 may move in x- and y-directions at a predetermined speed while the liquid crystal dispensing apparatus 120 remains in a fixed position and dispenses liquid crystal material at predetermined times. As a result, droplets of liquid crystal material may be arranged on the substrate 105 and spaced apart from each other along x- and y-directions at predetermined intervals. In a second aspect of the present invention, the substrate 105 may remain in a fixed position while the liquid crystal dispensing apparatus 120, moving in x- and y-directions, dispenses liquid crystal material onto the substrate. Similar to the effect of the preceding aspect, droplets of liquid crystal material may be arranged on the substrate 105 and spaced apart from each other along x- and y-directions at predetermined intervals. By the second aspect, liquid crystal material may, however, by dispensed non-uniformly onto the substrate 105 due to the movement of the liquid crystal dispensing apparatus 120. Accordingly, the locations of, and amount of liquid crystal material contained in, droplets arranged on the substrate 105 may deviate from the predetermined locations and amounts. Therefore, dispensing liquid crystal material according to the first aspect is generally preferred over the second aspect.

Figure 7A:
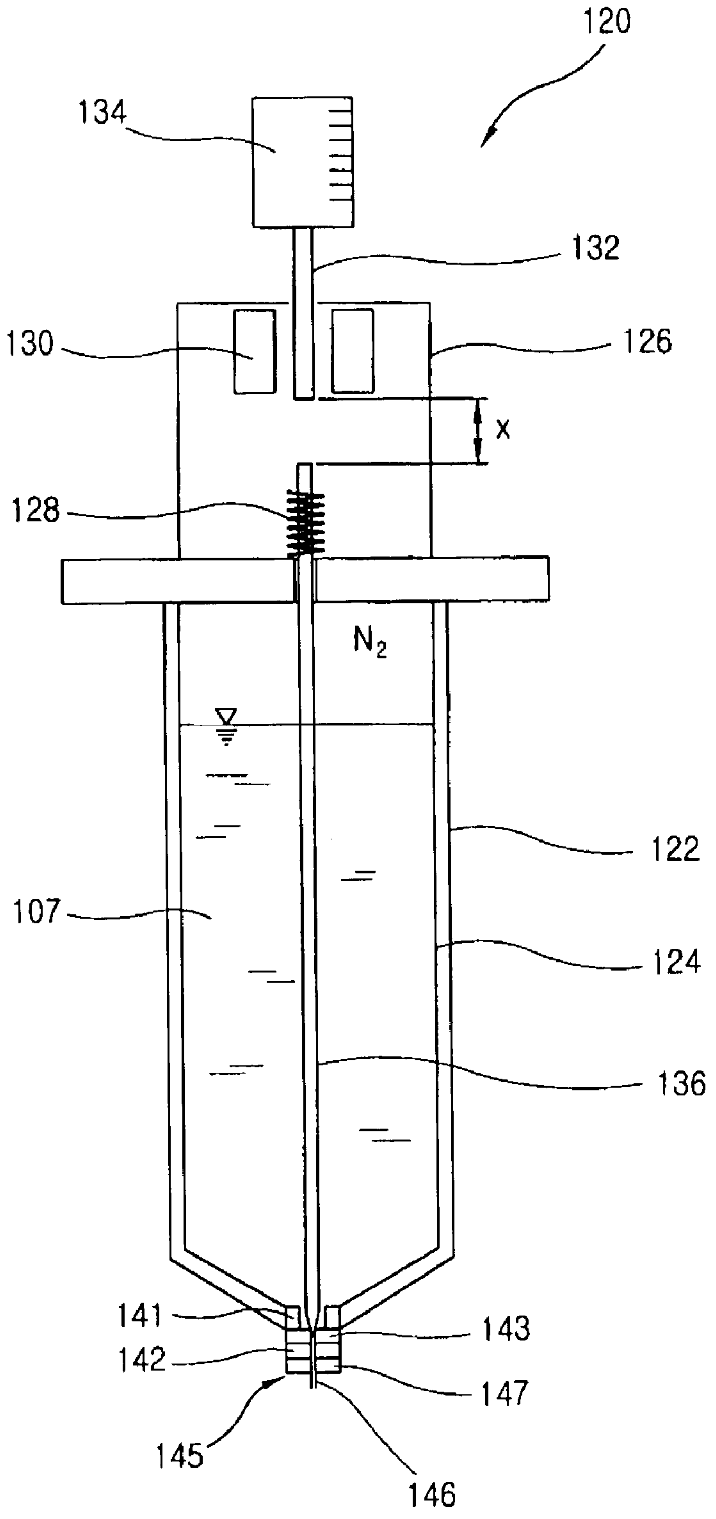
FIGS. 7A and 7B illustrate a liquid crystal dispensing apparatus according to one aspect of the present invention.
Figure 7B:
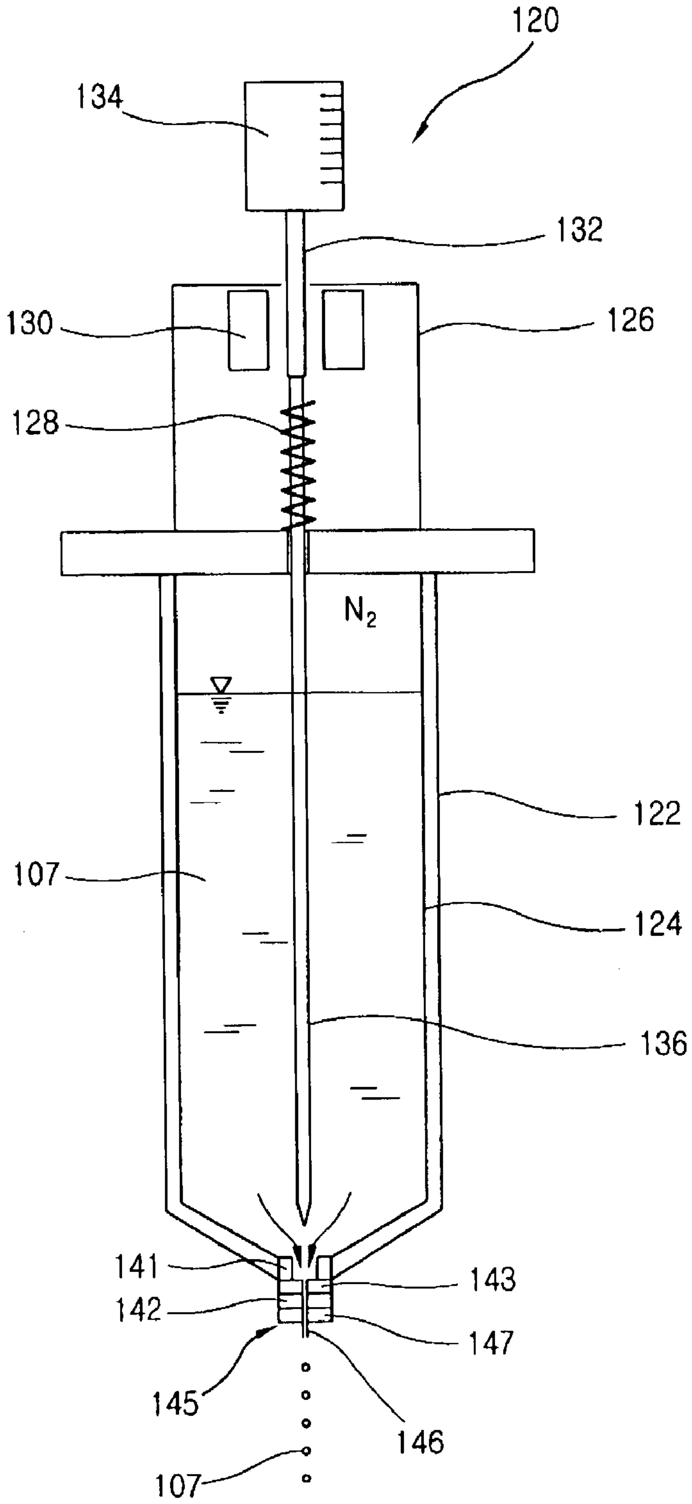

FIGS. 7A and 7B illustrate a liquid crystal dispensing apparatus according to one aspect of the present invention. FIG. 7A illustrates the liquid crystal dispensing apparatus when liquid crystal material is not dispensed. FIG. 7B illustrates the liquid crystal dispensing apparatus when liquid crystal material is dispensed.

Referring to FIGS. 7A and 7B, the liquid crystal dispensing apparatus may, for example, include a cylindrically shaped liquid crystal container 124. In one aspect of the present invention, the liquid crystal container 124 may be made of a material a having a high moldability, high plasticity, and that is substantially non-reactive with liquid crystal material (e.g., polyethylene, etc.). Materials such as polyethylene, however, have a low strength and may therefore become easily deformed by applied stresses. When the liquid crystal container 124 is deformed, liquid crystal material cannot be dispensed precisely onto the substrate. Accordingly, the container 124 may be inserted within case 122. In one aspect of the present invention, case 122 may be formed of a material having a high strength (e.g., stainless steel, etc.). Although not shown, a gas supply tube connected to an exterior gas supply unit may be arranged at an upper portion of the liquid crystal container 124. Gas such as nitrogen ($N_2$) may be provided by the exterior gas supply unit, transported through the gas supply tube, and arranged within portions of the liquid crystal container 124 not occupied by liquid crystal material 107. Accordingly, the gas may press on the liquid crystal material 107.

Although not shown, a protrusion may extend from a lower portion of the liquid crystal container 124 and an opening may be formed within the case 122 to receive the protrusion. Accordingly, the protrusion of the liquid crystal container 124 may be inserted into the opening of the case 122 and coupled to a first coupling portion 141. A first nut may be arranged on the protrusion while a first bolt may be formed on a first side of the first coupling portion 141. Accordingly, the protrusion and the first coupling portion 141 may be coupled together via the first nut and first bolt.

In one aspect of the present invention, a second nut may be formed on a second side of the first coupling portion 141 and a second bolt may be formed on a first side of a second coupling portion 142. Accordingly, first and second coupling portions 141 and 142 may be coupled to each other via the second nut and the second bolt. A needle sheet 143 may be provided within the second nut of the first coupling portion 141. Accordingly, the needle sheet 143 may be arranged between the first and second coupling portions 141 and 142 when the second bolt of the second coupling portion 142 is inserted into and coupled with the second nut of the first coupling portion 141. Liquid crystal material 107 may exit the liquid crystal dispensing apparatus 120 via a discharge hole (not shown) formed within the needle sheet 143.

In one aspect of the present invention, a nozzle 145 may be arranged on the second coupling portion 142 and coupled to the first coupling portion 141 via the second nut and second bolt. The nozzle 145 may include a supporting portion 147 coupled to the second nut and a discharge opening 146, through which liquid crystal material 107 within the liquid crystal container 124 may be dispensed onto the substrate. In one aspect of the present invention, the discharge opening 146 may protrude from the supporting portion 147. In another aspect of the present invention, a discharge tube (not shown) may be connected to the discharge opening 146 and extend from the discharge hole formed within the needle sheet 143. The discharge opening 146 formed within the nozzle 145 may be have a small diameter to allow precise control in dispensing liquid crystal material.

A needle 136 may be inserted into the liquid crystal container 124 such that a first end of the needle 136 contacts the needle sheet 143. In one aspect of the present invention, the first end of the needle 136 may be provided with a conical shape having dimensions substantially conformal to the dimensions of the discharge hole. When the needle 136 contacts the needle sheet, the needle may block the discharge hole.

According to the principles of the present invention, a second end of the needle 136 may be arranged near an upper case 126 of the liquid crystal dispensing apparatus 120 where a spring 128 and magnetic bar 132 are provided. The magnetic bar 132 may be formed of a ferromagnetic or soft magnetic material. A gap controlling unit 134 may be connected to the needle 136 above the magnetic bar 132. A solenoid coil 130 having, for example, a cylindrical shape may be arranged to surround at least a portion of the magnetic bar 132. The solenoid coil 130 may be connected to, and receive electric power from, an electric power supply unit (not shown). Upon receipt of the electric power, the solenoid coil 130 may exert a magnetic force on the magnetic bar 132.

In one aspect of the present invention, the needle 136 and the magnetic bar 132 may be spaced apart from each other by a predetermined distance, x. When the electric power is applied to the solenoid coil 130, a magnetic force is exerted on the magnetic bar 132 to induce the needle 136 to contact the magnetic bar 132. When the electric power is not applied to the solenoid coil 130, the elastic force of the spring 128 pushes the needle 136 to its original position. By the movement of the needle 136 toward and away from the needle sheet 143, the discharge hole formed in the needle sheet 143 may be opened or closed. As the first end of the needle 136 and the needle sheet 143 may contact each other repeatedly, depending on the presence of electric power applied to the solenoid coil 130, the first end of the needle 136 and the needle sheet 143 may become damaged. Accordingly, the first end of the needle 136 and the needle sheet 143 may be formed of a material that substantially resists deformation (e.g., a hard metal).

Referring to FIG. 7B, when electric power is applied to the solenoid coil 130, the needle 136 is moved away from the needle sheet and the discharge hole is opened. Accordingly, nitrogen gas supplied to the liquid crystal container 124 presses on the liquid crystal material 107 and causes it to be dispensed via the nozzle 145. The amount of liquid crystal material 107 dispensed depends upon the time during which the discharge hole is open and the pressure of the nitrogen gas within the liquid crystal container. The time during which the discharge hole is opened depends upon the distance, x, between the needle 136 and the magnetic bar 132, the magnetic force exerted on the magnetic bar 132 by the solenoid coil, and the intrinsic elastic force of the spring 128. The magnetic force exerted on the magnetic bar 132 is proportional to the winding number of the solenoid coil 130 or the magnitude of the electric power applied to the solenoid coil 130. The distance, x, between the needle 136 and the magnetic bar 132 may be controlled by the gap controlling unit 134.

In one aspect of the present invention, the nozzle 145 may be formed out of a material (e.g., a metal such as stainless steel) that forms a low contact angle with liquid crystal material. As used herein, the term "contact angle" identifies the angle formed between the surface of a solid (e.g., stainless steel nozzle) and a liquid (e.g., liquid crystal material) existing in thermodynamic equilibrium. Accordingly, the contact angle between the solid and liquid represents the degree of hydrophilicity between the two materials. Stainless steel has high hydrophilicity with respect to liquid crystal material and therefore is easily wetted by liquid crystal material. Liquid crystal material dispensed has a lower surface energy than the nozzle through which it is discharged. Because the liquid crystal material has a lower surface energy than the surface of the nozzle, a low contact angle is formed and the liquid crystal material spreads over the surface of the nozzle 145. Accordingly, the dispensed liquid crystal does not form a droplet shape, indicative of a high contact angel, at a terminal end of the discharge opening in the nozzle 145.

Figure 8:
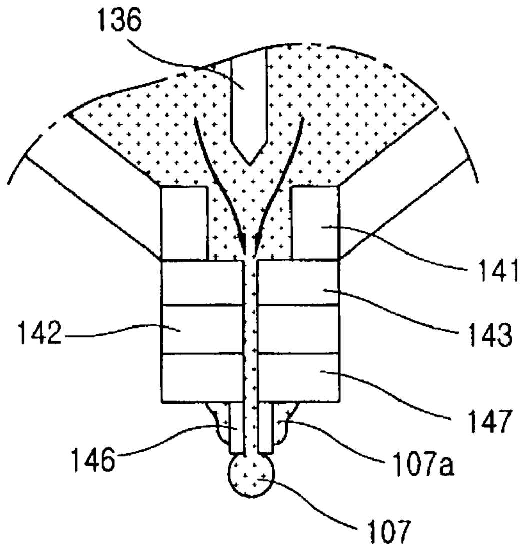
FIG. 8 illustrates excessive liquid crystal material a surface of a nozzle as liquid crystal material is dispensed from a liquid crystal dispensing apparatus according to one aspect of the present invention.

Referring to FIG. 8, as liquid crystal material 107 is repeatedly dispensed, liquid crystal residue 107*a* accumulates on the surface of the nozzle 145. The amount of liquid crystal material dispensed may be controlled according to the time during which the discharge hole of the nozzle sheet 143 is opened by the needle 136 and the pressure of the nitrogen gas within the liquid crystal container. When the dispensed liquid crystal material 107 spreads over the surface of the nozzle 145, dispensing liquid crystal material in precise amounts at precise locations becomes impossible. Further, when a portion of the dispensed liquid crystal material spreads over the surface of nozzle 145, the amount of liquid crystal material dispensed onto the substrate is less than the amount actually discharged from the discharge opening 146. While the amount of liquid crystal material discharged through the discharge opening 146 may be roughly controlled, it is, however, extremely difficult to precisely calculate the amount of liquid crystal material that spreads over the surface of the nozzle 145. Further, liquid crystal residue 107*a* accumulated on the surface of the nozzle 145 may be carried away by subsequently dispensed liquid crystal material resulting in an excessive amount of liquid crystal material dispensed onto a substrate.

In order to reduce the amount of liquid crystal residue accumulated, the surface of nozzle 145 may be coated with a fluorine resin film via techniques such as dipping, spraying, etc. The fluorine resin film has a low hydrophilicity with respect to liquid crystal material. Therefore, the fluorine resin film has a lower surface energy than the liquid crystal material and a high contact angle may therefor be formed with the dispensed liquid crystal material. Accordingly, when the nozzle 145 is coated with the fluorine resin film, a reduced amount of liquid crystal material 107 discharged through the discharge opening 146 spreads and a more precise amount of liquid crystal material may be dispensed onto the substrate. However, even when the nozzle 145 is coated with the fluorine resin film, a small amount of liquid crystal residue is accumulates on the surface of the nozzle and needs to be periodically removed.

Accordingly, in one aspect of the present invention, a nozzle cleaning device may be provided to remove liquid crystal residue accumulated on the surface of the nozzle 145. In another aspect of the present invention, the nozzle cleaning device may incorporate a vacuum capable of removing the liquid crystal residue.

Figure 9:
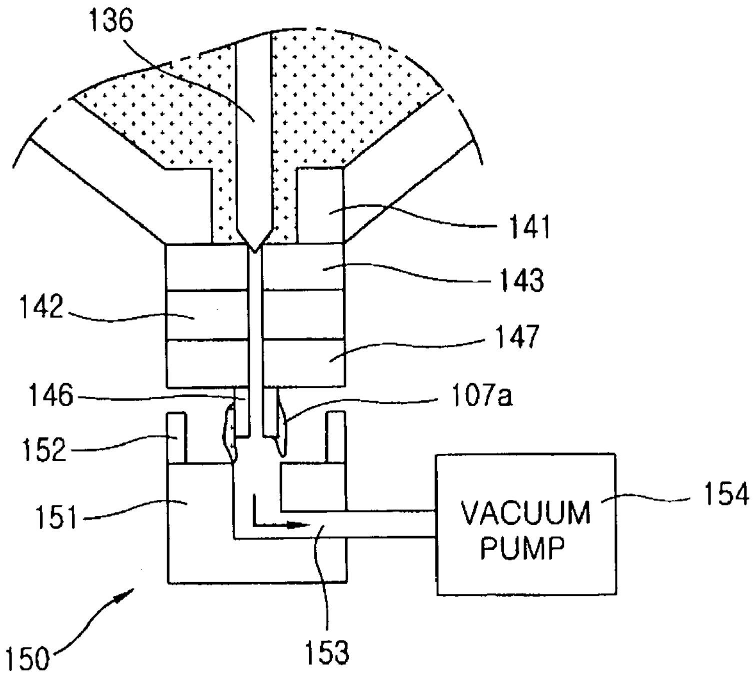
FIG. 9 illustrates a liquid crystal dispensing apparatus incorporating a nozzle cleaning device according to one aspect of the present invention.

FIG. 9 illustrates a liquid crystal dispensing apparatus incorporating a nozzle cleaning device according to one aspect of the present invention.

Referring to FIG. 9, a nozzle cleaning device 150 may, for example, include a main body 151, a suction tube 153 arranged on the main body 151, and a vacuum pump connected to the suction tube 153. As liquid crystal residue 107*a* generally accumulates on the surface of nozzle 145 around the edge of discharge opening 146, the suction tube 153 may be aligned with the discharge opening 146.

The nozzle 145 may be cleaned periodically using the nozzle cleaning device 150. For example, after liquid crystal material 107 is dispensed a predetermined number of times, the nozzle cleaning device 150 may be arranged operably proximate the nozzle 145 via a motor (not shown) and aligned with the with the discharge opening 146 of the nozzle 145. In one aspect of the present invention, a supporting portion 152 may arranged on the main body 151. The supporting portion 152 may stabilize the main body 151 on the nozzle 145 and maintain a space between the discharge opening 146 and the suction tube 153 when the discharge opening 146 and the suction tube 153 are aligned. When the discharge opening 146 and suction tube 153 are aligned, the vacuum pump 154 may be activated and a vacuum force is transmitted by the suction tube 153. Subsequently, liquid crystal residue 107*a* arranged around the nozzle 145, including liquid crystal residue arranged around the discharge opening 146, is sucked into the suction tube 153. Accordingly, liquid crystal residue 107*a* may be removed from the surface of nozzle 145.

According to the principles of the present invention, a micro-computer may be provided for operating the motor (not shown) installed on the nozzle cleaning device according to a nozzle predetermined cleaning time set by an operator. The micro-computer may also drive the vacuum pump to remove the liquid crystal residue from the surface of nozzle. The micro-computer may, for example, be arranged within, or on an exterior of, the liquid crystal dispensing apparatus. According to the principles of the present invention, the frequency with which the nozzle is cleaned may determined according to the rate at which liquid crystal residue accumulates on the nozzle. Accordingly, the nozzle may be cleaned based the amount of liquid crystal residue accumulated on the nozzle 145 every time liquid crystal material is dispensed. Upon measuring the amount of liquid crystal residue accumulated on the nozzle, the number of times liquid crystal material may be dispensed before accumulating a threshold maximum amount of liquid crystal residue may be calculated. The micro-computer may move the motor (not shown) to the nozzle 145 after liquid crystal material is dispensed the calculated number of times and activate the vacuum pump 154. By the aforementioned process, liquid crystal residue accumulated on the surface of nozzle 145 may be removed.

In one aspect of the present invention, the nozzle 145 may be cleaned when liquid crystal is not dispensed (e.g., when the needle 136 contacts the needle sheet 143 and blocks the discharge hole). If the nozzle, however, is cleaned when the needle 136 does not contact the needle sheet 143, liquid crystal material 107 within the liquid crystal container 124 is provided to the nozzle cleaning device 150.

Figure 10:
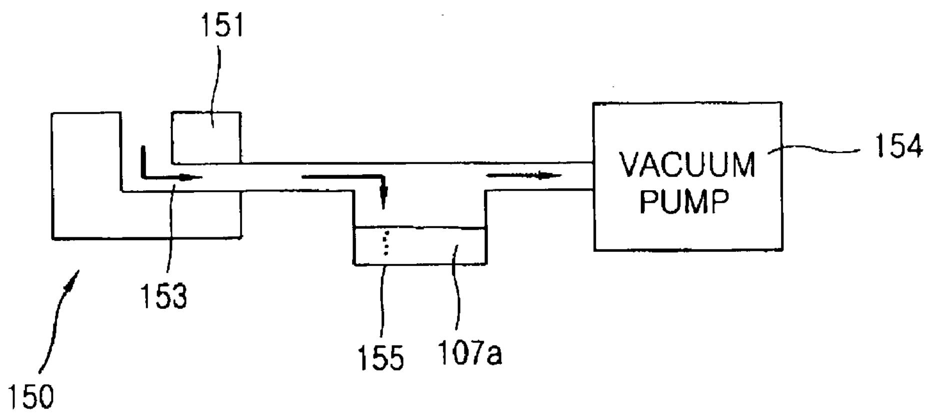
FIG. 10 illustrates a nozzle cleaning device having a liquid crystal material collecting chamber.

FIG. 10 illustrates a nozzle cleaning device having a liquid crystal material collecting chamber.

Referring to FIG. 10, the nozzle cleaning device 150 may include a receiving chamber 155 for collecting the liquid crystal residue 107*a* sucked into the suction tube 153 when the vacuum pump 154 is activated. The liquid crystal residue 107*a* may be received into the receiving chamber 155 via gravity. Accordingly, liquid crystal residue 107*a* may be prevented from reaching the vacuum pump 154. In one aspect of the present invention, the receiving chamber 155 may be separated from the nozzle cleaning device 150 to facilitate the discarding to liquid crystal residue collected by the receiving chamber 155.

According to the principles of the present invention, liquid crystal material 107 within the discharge tube 159 extending from the discharge hole of the needle sheet 143 to the discharge opening 146 of the nozzle 145 makes up a portion of the liquid crystal material dispensed onto the substrate. Even when the discharge hole within the needle sheet 143 is blocked by the needle 136, liquid crystal material 107 filled the discharge tube 159. As shown in FIG. 9, when the suction tube 153 is aligned with the discharge opening 146, all of the liquid crystal material 107 within the discharge tube 159 is sucked by the vacuum and subsequently discarded. Using the nozzle cleaning device illustrated in FIG. 9, an excessive amount of expensive liquid crystal material is removed during cleaning.

Figure 11:
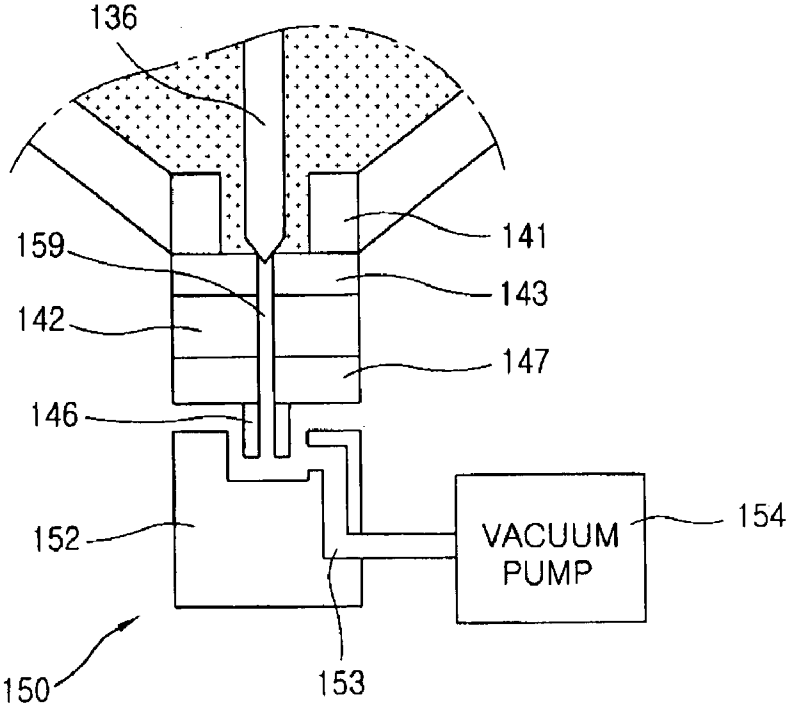
FIG. 11 illustrates a liquid crystal dispensing apparatus incorporating a nozzle cleaning device according to another aspect of the present invention.

In an another aspect of the present invention shown in FIG. 11, the suction tube 153 may be formed on the supporting portion 152 instead of the main body 151 of the nozzle cleaning device 150. As shown in FIG. 11, the suction tube 153 may be arranged at a side of the discharge opening. Accordingly, the discharge tube 159 is not directly exposed to the suction forces transmitted by the suction tube 153. Accordingly, liquid crystal residue accumulated on the surface of the nozzle may be sucked into the suction tube 153 while liquid crystal material within the discharge tube 159 is not removed such that consumption of liquid crystal material during the nozzle cleaning process can be minimized.

According to the principles of the present invention, a nozzle cleaning means comprises a nozzle cleaning device having a vacuum arranged at a lower portion of a nozzle 145 of a liquid crystal dispensing apparatus. The nozzle cleaning means may facilitate removal of liquid crystal residue accumulated on a surface of the nozzle. In one aspect of the present invention, the liquid crystal dispensing apparatus may, for example, include a needle sheet, a first coupling portion, and a second coupling portion formed as a unitary piece. The liquid crystal dispensing apparatus may include a discharge opening formed in the nozzle and a protecting means (e.g., a protecting wall formed around the discharge opening) for protecting the discharge opening 146.

According to the principles of the present invention, the nozzle cleaning device is capable of removing liquid crystal residue accumulated on the surface of a nozzle and may incorporate a vacuum. Using the nozzle cleaning device of the present invention, the dispensing of inaccurate amounts of liquid crystal material can be prevented. Accordingly, LCDs may be prevented from being formed with layers of liquid crystal material having an uneven thickness.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal dispensing apparatus, comprising:

a liquid crystal dispensing means capable of containing liquid crystal material and dispensing the contained liquid crystal material onto a substrate through a nozzle, a surface of the nozzle coated with a fluorine resin film, the liquid crystal dispensing means including:

a liquid crystal container for containing the liquid crystal material to be dispensed;

a needle sheet arranged at a lower portion of the liquid crystal container, the needle sheet including a discharge hole through which the liquid crystal material is capable of being dispensed;

a needle arranged within the liquid crystal container, the needle capable of moving toward and away from the discharge hole, the needle including a first end and a second end, wherein the second end is capable of selectively contacting the discharge hole;

a solenoid coil and a magnetic bar arranged operably proximate the first end of the needle, for generating magnetic force upon the application of an electric power and for ascending the needle away from the discharge hole;

a spring arranged at the first end for providing tension force to the needle for descending the needle to restore the needle to the discharge hole;

a gap controlling unit formed at one end portion of the magnetic bar to control the gap between the needle and other end portion of the magnetic bar; and a coupling portion for coupling the liquid crystal container with the nozzle, the coupling portion including a first portion coupled with the liquid crystal container and a second portion coupled with the nozzle, the needle sheet being disposed between the first portion and the second portion, a bolt of the first portion being coupled with a nut of the liquid crystal container, and a nut of the first portion being coupled with a bolt of the second portion, and a nut of the second portion being coupled with the nozzle;

a main body;

a supporting portion arranged on the main body for stabilizing the main body on the nozzle when the nozzle is cleaned;

a vacuum pump for generating a vacuum force; and a suction tube connected to the vacuum pump for transmitting the generated vacuum force to the nozzle and removing residue accumulated on the surface of the nozzle, wherein the vacuum pump and the suction tube being separate from the liquid crystal dispensing means, the vacuum pump and the suction tube moving around the nozzle when the liquid crystal residue is accumulate on the surface of the nozzle, wherein the suction tube is arranged in the supporting portion so that the suction tube is located at the side region of the nozzle.

2. The apparatus of claim 1, wherein the liquid crystal dispensing means comprises:

a gas input for supplying gas into the liquid crystal container; and a case for receiving the liquid crystal container.

3. The apparatus of claim 1, wherein the nozzle cleaning means further comprises a receiving chamber connected to the suction tube for collecting liquid crystal residue sucked into the suction tube.

4. The apparatus of claim 1, wherein the nozzle cleaning means comprises a motor capable of being moved toward the nozzle when the nozzle is to be cleaned.

5. The apparatus of claim 4, wherein the motor is moved toward the nozzle after a predetermined number of times the liquid crystal is dispensed.

* * * * *